(12) United States Patent
Duits

(10) Patent No.: US 8,508,168 B2
(45) Date of Patent: Aug. 13, 2013

(54) LINEAR ACTUATOR

(75) Inventor: Johannes Andrianus Maria Duits, Bodegraven (NL)

(73) Assignee: Aktiebolaget SKF, Gothenburg (SE)

( * ) Notice: Subject to any disclaimer, the term of this patent is extended or adjusted under 35 U.S.C. 154(b) by 263 days.

(21) Appl. No.: 12/996,063

(22) PCT Filed: Jun. 3, 2008

(86) PCT No.: PCT/EP2008/056855
§ 371 (c)(1),
(2), (4) Date: Dec. 3, 2010

(87) PCT Pub. No.: WO2009/146738
PCT Pub. Date: Dec. 10, 2009

(65) Prior Publication Data
US 2011/0089879 A1 Apr. 21, 2011

(51) Int. Cl.
*G05D 3/12* (2006.01)
*H02H 7/085* (2006.01)

(52) U.S. Cl.
CPC ................................ *H02H 7/0851* (2013.01)
USPC ........... 318/468; 318/469; 318/470; 318/471; 318/472

(58) Field of Classification Search
CPC .................................................... H02H 7/0851
USPC ......................................... 318/468, 469–474
See application file for complete search history.

(56) References Cited

U.S. PATENT DOCUMENTS

| 312,340 A | 2/1885 | Dun |
| 2,469,269 A | 5/1949 | Lear |
| 4,628,499 A * | 12/1986 | Hammett ........................ 700/56 |
| 4,854,189 A * | 8/1989 | Ulbing ............................ 74/640 |
| 4,858,481 A * | 8/1989 | Abraham ..................... 74/89.38 |
| 5,187,993 A | 2/1993 | Nicholson et al. |
| 6,453,761 B1 | 9/2002 | Babinski |
| 6,807,877 B2 * | 10/2004 | Sato et al. ................... 74/89.37 |
| 2006/0192507 A1 | 8/2006 | Gill |

FOREIGN PATENT DOCUMENTS

| DE | 2406201 A1 | 8/1975 |
| DE | 9104962 U1 | 6/1991 |
| EP | 1101571 A2 | 5/2001 |
| EP | 1524455 A2 | 4/2005 |
| FR | 2612011 A1 | 9/1988 |
| WO | WO9105399 A1 | 4/1991 |

* cited by examiner

*Primary Examiner* — Eduardo Colon Santana
*Assistant Examiner* — David Luo
(74) *Attorney, Agent, or Firm* — Bryan Peckjian; SKF USA Inc. Patent Department

(57) ABSTRACT

Linear actuator device, comprising a housing (102,202), a piston rod (109,209), an electrical motor (116,216) and a transmission means (105,106,305,307) adapted to transfer the rotation of the electrical motor to a linear movement of the piston rod, where the linear actuator device comprises an integrated electrical interface having two signal inputs adapted to extend and retract the piston rod and two signal outputs adapted to indicate a retracted end position (122) and an extended end position (121) of the piston rod.

10 Claims, 3 Drawing Sheets

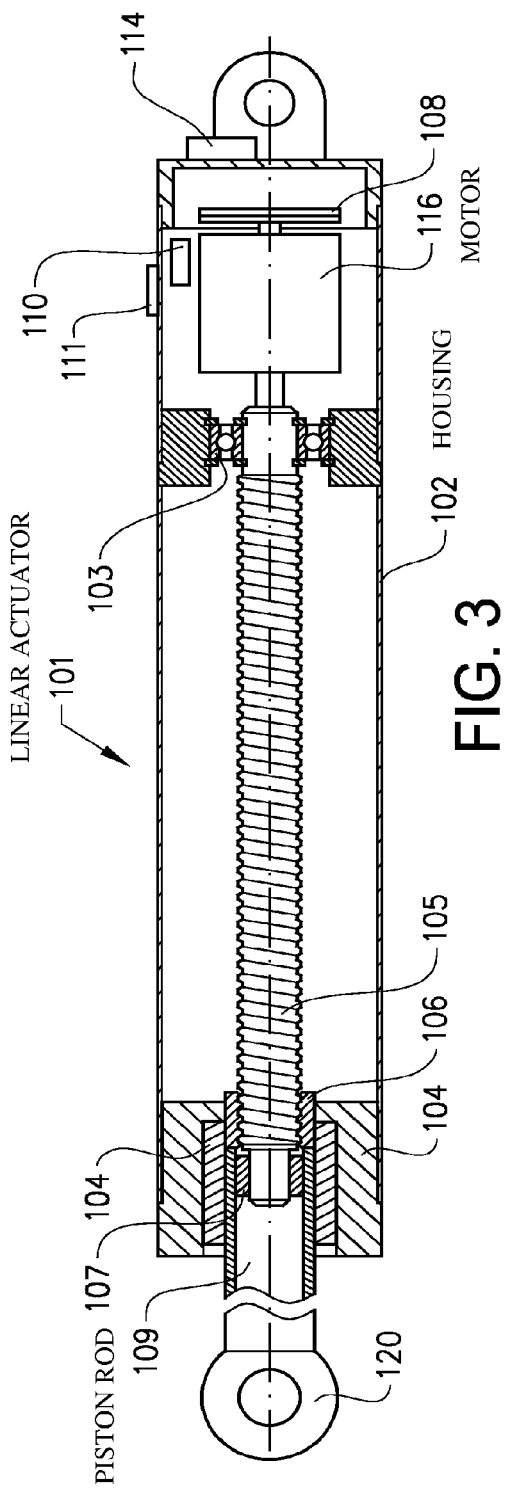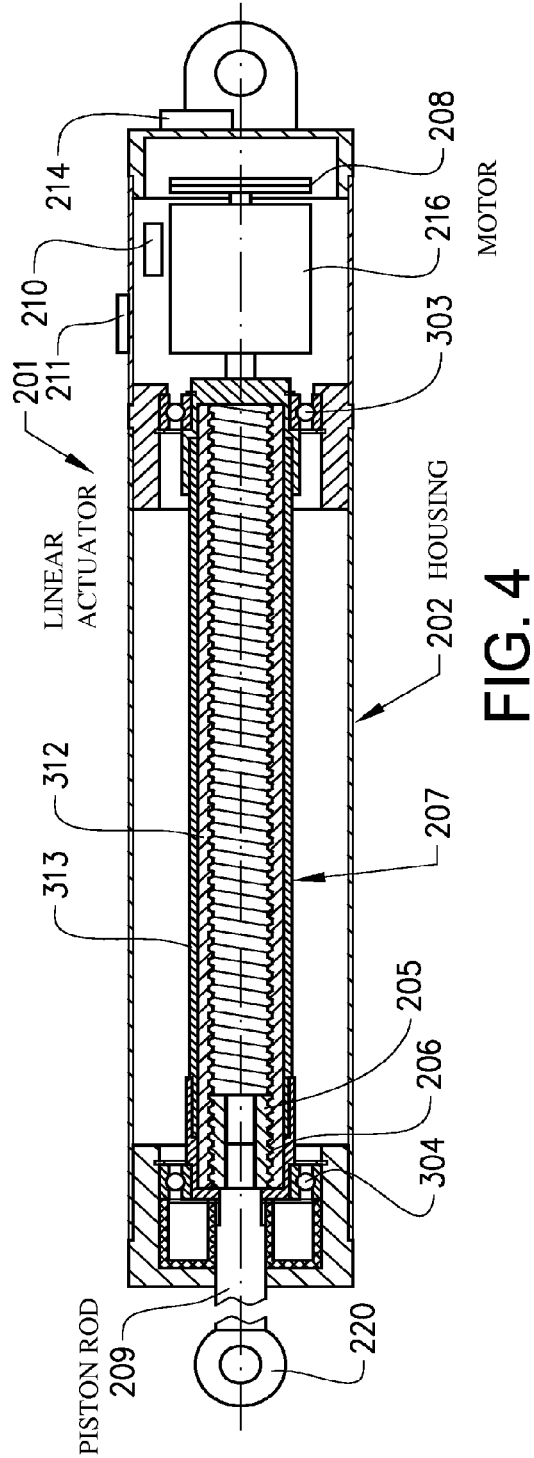

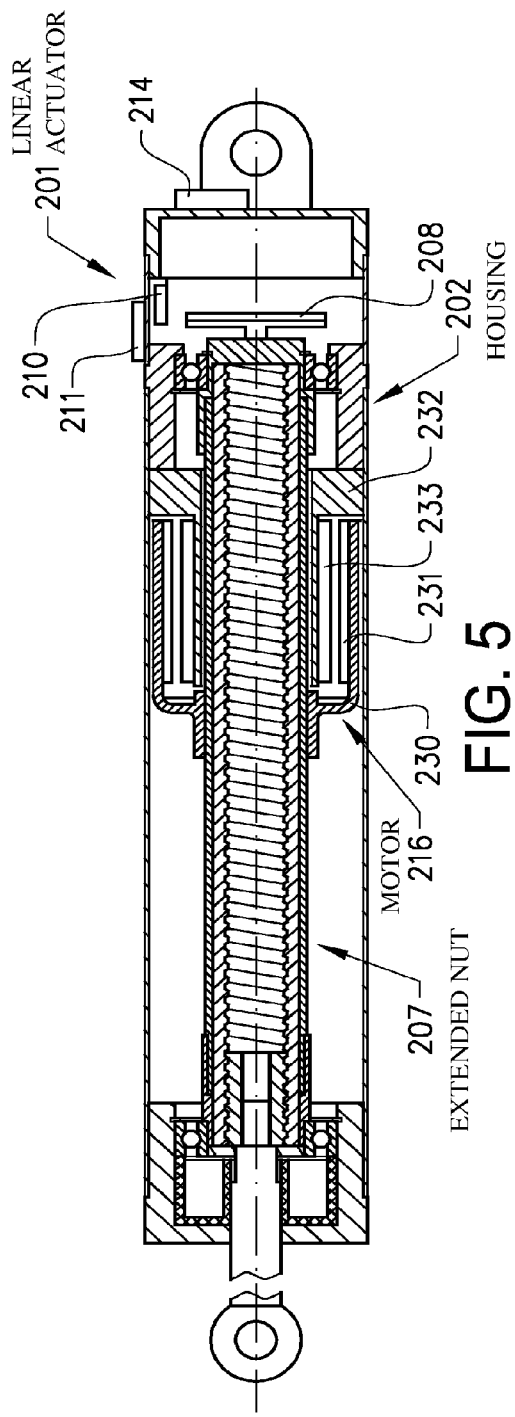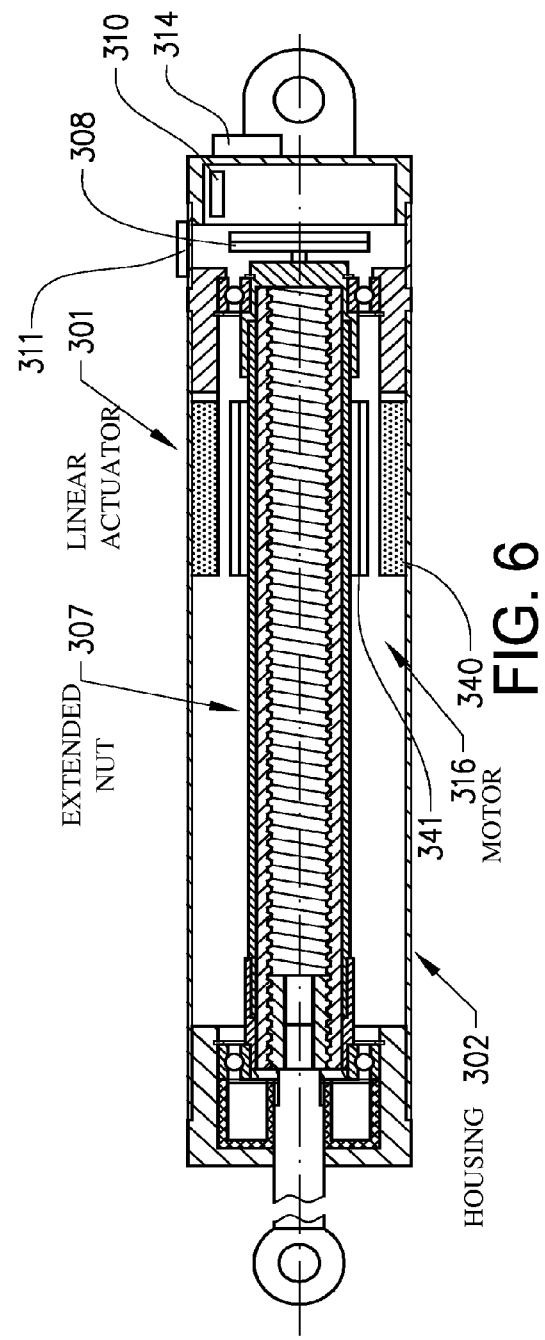

LINEAR ACTUATOR

TECHNICAL FIELD

The present invention relates to a linear actuator with an integrated electrical interface.

BACKGROUND ART

Linear actuators are used to move an object along a straight line, either between two end points or to a defined position. Actuators may be air or hydraulic driven using pressure or they may be driven by electricity. Air or hydraulic driven actuators are cheap and simple in design. They are also easy to control, but they require an air or hydraulic supply which is relatively expensive, especially for small systems.

The control of a pneumatic actuator is done with a system comprising controlled valves and sensors, normally in the form of limit switches. The control system may be completely pneumatic, i.e. comprising air controlled valves and sensors opening or closing an air supply. Such systems may be used in small and simple applications, when only a few actuators and sensors are used. In larger applications, the system is normally electro-pneumatic having electrically controlled valves and electronic position sensors, e.g. proximity sensors or limit switches. The position sensors give a signal when the actuator has reached a predefined position, and may be positioned on the actuator such that they will detect the end positions of the actuator itself, or they may be positioned externally from the actuator, detecting end positions of e.g. a work piece. The electrically controlled valves will open selectively to feed air to the piston so that the actuator will extend or retract.

There are different types of control systems used in the industry. In larger systems, the different actuators and sensors will be connected to a bus-system of some kind, e.g. fieldbus, profibus, CANopen or DeviceNet. These bus systems require a bus interface for each connected node. A node may comprise a bus controlled I/O-interface of some kind. In less advanced systems, the control system may be a PLC (Programmable Logic Controller) system, in which one or more PLC units are connected to the actuators and sensors via input and output ports. In this case, an electric linear actuator and a separate control unit with a PLC interface for the connection to the control system will be used.

A simple control system for controlling an electro-pneumatic linear actuator will use four control signals, two control output signals and two sensor input signals. The output signals will be one signal for travelling up/extend and one signal for travelling down/retract. When the signal is e.g. high, the actuator will travel and when the signal is low, the actuator will rest. The input signals detects when the actuator has reached an end stop, e.g. the maximum/extended and minimum/retracted end stops. One sensor may e.g. give a high output when that sensor has detected the maximum/extended position.

Electrically driven linear actuators normally incorporate a rotating motor and some kind of transmission means to convert the relatively high-speed rotating motor to a low speed linear motion. This transmission means may incorporate a gear box and/or a screw shaft. One common type of linear actuator incorporates a screw shaft with a nut running thereon. The screw shaft extends over the full length of the actuator and sets the operating length of the actuator. Since the nut is held in a non-rotatable state, the nut will be displaced when the screw shaft is rotated by the motor. The nut may incorporate rolling elements, such as balls or rollers, between the screw shaft and the nut. This will allow for a high efficiency actuator with high load transfer and long life. The nut may also engage directly with the screw shaft, i.e. a sliding screw design. In this case, the nut is preferably made of a plastic material.

Both pneumatic and hydraulic linear actuators are widely used in the industry, partly for historic reasons. Earlier, especially air was considered as a cheap, safe and user-friendly energy source compared with electricity. This is not the case anymore. Thus, there are some advantages in replacing electrically controlled pneumatic linear actuators with electric linear actuators. However, since electric linear actuators have different mechanical properties and also have a different electric interface, the replacement is often only possible or reasonable to carry out when a redesign of the system is realised.

There is thus room for an improved electric linear actuator.

SUMMARY OF THE INVENTION

An object of the invention is therefore to provide an improved linear actuator having the same electric interface as an electrically controlled pneumatic actuator. A further object of the invention is to provide a compact linear actuator with integrated end position detection. Another object of the invention is to provide an electric linear actuator having the same mechanical properties as a pneumatic linear actuator. Another object of the invention is to provide an electric linear actuator with programmable end positions.

For a linear actuator device, comprising a housing, a piston rod, an electrical motor and a transmission means adapted to transfer the rotation of the electrical motor to a linear movement of the piston rod, the object of the invention is achieved in that the linear actuator device comprises an integrated electrical interface having two signal inputs adapted to extend and retract the piston rod and two signal outputs adapted to indicate a retracted end position and an extended end position of the piston rod.

By this first embodiment of the linear actuator according to the invention, a linear actuator comprising a simple electric interface that can be connected to a standardised PLC is provided. This is advantageous in that an electrically controlled pneumatic actuator can be replaced with the inventive linear actuator without the need of reprogramming the PLC.

In an advantageous development of the invention, the linear actuator device comprises a rotation sensor adapted to measure the rotation of the motor or the transmission means, and a microcontroller that is adapted to receive the signal of the rotation sensor. The advantage of this is that the position of the linear actuator can be detected.

In an advantageous development of the invention, the retracted end position and the extended end position of the linear actuator are programmable. The advantage of this is that the same linear actuator can be used to replace different pneumatic linear actuators having different end stop positions, without the need to mechanically rebuild the actuator or move the end stop sensors.

In an advantageous development of the invention, the linear actuator device comprises a user interface having manual buttons and indication means. The advantage of this is that the programming of the end positions of the actuator can be done without the need of external equipment. It will also be possible to adjust the end position of the actuator in an easy and simple way.

In an advantageous development of the invention, the programming of an end position is made by manually driving the piston rod to the desired end position and then storing the end position as a retracted end position or an extended end position using the user interface. This allows for an easy programming of the end positions of the actuator.

In an advantageous development of the invention, the transmission means comprises a nut fixedly attached to the piston rod and an extended, externally threaded lead screw connected to the motor. The advantage of this is that a conventional and cost-effective linear actuator can be used for the inventive linear actuator.

In another advantageous development of the invention, the transmission means comprises a screw fixedly attached to the piston rod and an extended, internally threaded nut connected to the motor. This allows for a compact and cost-effective linear actuator. The internally threaded nut may comprise a plurality of segments. With an extended, internally threaded nut, different motors encircling the extended nut can be used. The rotor of the motor may either be attached to the extended nut or to the housing of the actuator.

BRIEF DESCRIPTION OF DRAWINGS

The invention will be described in greater detail in the following, with reference to the embodiments that are shown in the attached drawings, in which FIG. 3 shows the first embodiment of a linear actuator according to the invention in cut view, FIG. 4 shows a second embodiment of a linear actuator according to the invention in cut view, FIG. 5 shows a third embodiment of a linear actuator according to the invention in cut view, and FIG. 6 shows a development of the third embodiment of a linear actuator according to the invention in cut view.

DETAILED DESCRIPTION OF THE INVENTION

The embodiments of the invention with further developments described in the following are to be regarded only as examples and are in no way to limit the scope of the protection provided by the patent claims.

Figure 1:
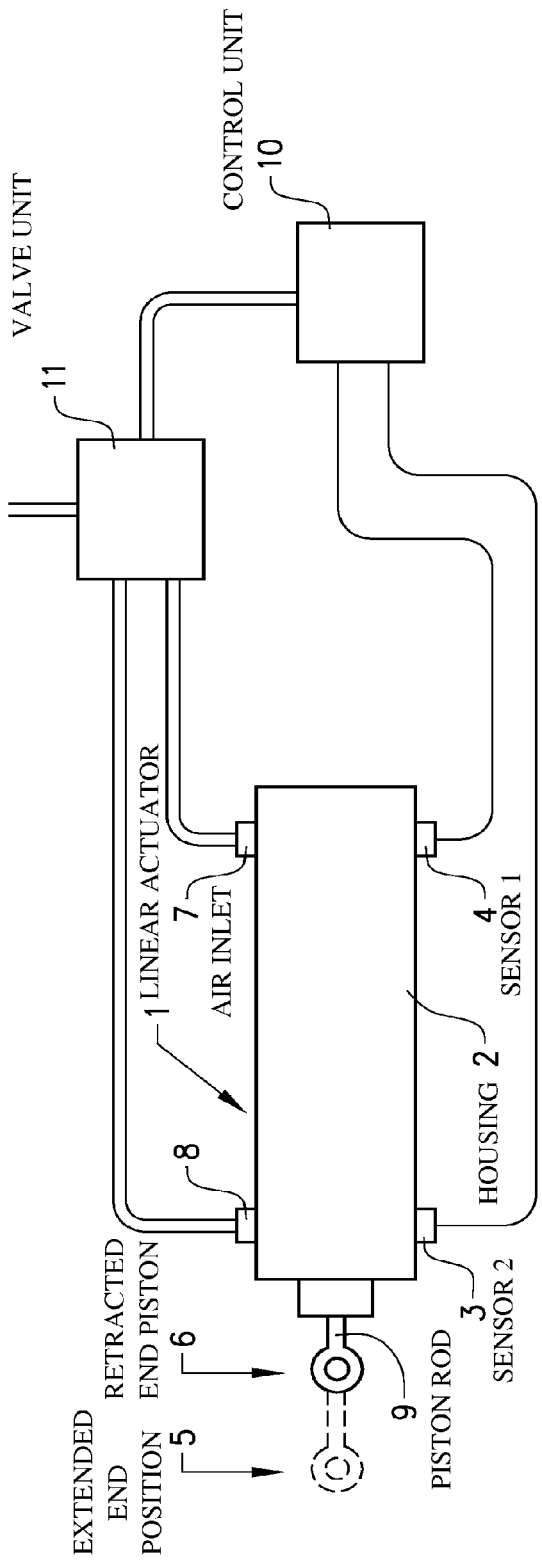
FIG. 1 shows a known electric control system for a pneumatic linear actuator.

FIG. 1 shows a known pneumatic linear actuator that is electrically controlled. The pneumatic system comprises a pneumatic linear actuator 1 having a housing 2, a piston rod 9, an electrically controlled valve unit 11, a first position sensor 4 that is adapted to sense the retracted end position 6 of the piston rod 9, a second position sensor 3 that is adapted to sense the extended end position 5 of the piston rod 9 and a control unit 10. The position sensors and the valve unit are connected to the control unit by wires. The valve unit is connected to the actuator via air pressure hoses, where the actuator comprises a first air inlet 7 and a second air inlet 8.

In a starting position, the piston is in a retracted state 6. In this state, the first position sensor 4 will indicate to the control unit that the piston is in the retracted position, e.g. by outputting a logic high signal. In order to bring the piston to the extended end position 5, the control unit will output the control signal out/extend to the valve unit, e.g. by applying a logic high to the out/extend input of the valve unit. The valve unit will open a valve that forwards pressurised air from an air supply to the first air inlet 7. The air will push the piston out of the actuator, in the direction to the extended position. At the same time, the first position sensor 4 will indicate to the control unit that the piston is not in the retracted position, e.g. by a logic low signal. During the traverse state, the second position sensor will also be low.

The valve unit will continue to supply air to the first air inlet until the second position sensor 3 indicates that the piston has reached the extended position 5, i.e. when the second position sensor outputs a logic high signal. When the control unit receives the signal from the second position sensor, it will discontinue the air supply to the first air inlet. The piston is now in the extended position 5.

After e.g. an operation is done in the system in which the actuator is mounted, the actuator may be retracted again. This is done in a similar way. The control unit opens a valve forwarding air to the second inlet 8. When the first position sensor indicates that the piston has reached the retracted position 6, the control unit closes the air supply to the second air inlet 8.

Such a linear pneumatic actuator is well-known and widely used in the industry. The interface between the PLC and the electric system controlling the pneumatic actuator is a simple, basic interface. It is however rather expensive and requires several components which has to be set up and adjusted.

Figure 2:
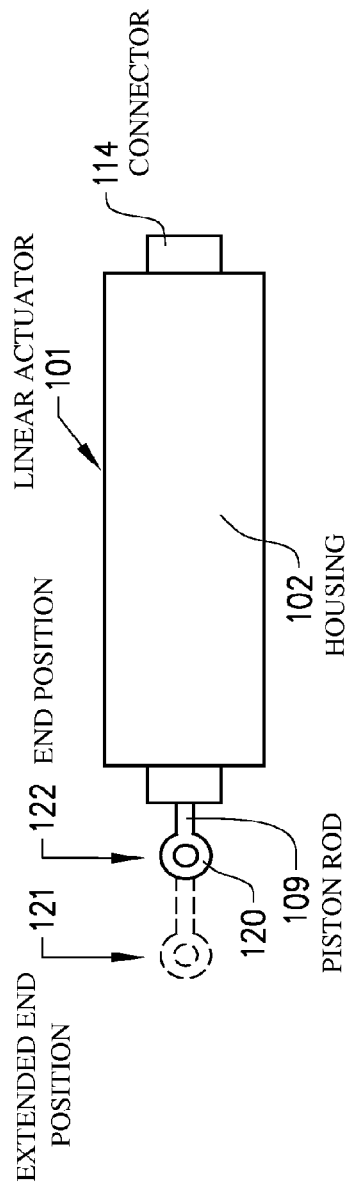
FIG. 2 shows a first embodiment of a linear actuator according to the invention.

FIG. 2 shows a first embodiment of a linear actuator device according to the invention. The linear actuator 101 comprises a housing 102 and a piston rod 109 with a front attachment means 120. The actuator is further provided with a connector 114 for the connection to a control unit. The piston rod can travel between a retracted end position 122 and an extended end position 121. The connector comprises one ground terminal, a voltage supply terminal, two input terminals and two output terminals.

A first input terminal will be used to extend the actuator, i.e. an extend signal will be fed to the input terminal when the piston rod is to extend out of the actuator. A second input terminal will be used to retract the actuator, i.e. a retract signal will be fed to the input terminal when the piston rod is to retract in to the actuator. A first output terminal will be used to indicate that the piston rod is at the retracted end position 122. A second output terminal will be used to indicate that the piston rod is at the extended end position 121.

The connector may also comprise other terminals for optional signals. The terminals are used to input and output signals to and from the control unit and to supply voltage to the microcontroller. The ground terminal is used as a reference for the input and output signals and is normally at a zero voltage. The input and output signals will be at a high level, e.g. 12, 24 or 48 volts, when they are passive and will connect to ground when active. In some systems, the reference terminal may be at a high level and the signals will be at a low level when they are active.

One purpose of the invention is to provide an electric linear actuator that can replace a pneumatic linear actuator together with the electro-pneumatic control system as described above. A pneumatic linear actuator, two proximity sensors and the valve unit is thus possible to replace with the inventive linear actuator without the need of reconfiguring or reprogramming the electric control system. This makes it possible to replace only parts of a complete system in an industrial application, e.g. when a pneumatic actuator breaks down or when only a cell or part of a cell in the system is modified. By providing the same electric interface, the complete control system must not be modified, which will save considerable amounts of both time and cost.

A further purpose of the invention is to provide a linear actuator that, together with the electrical interface, also has similar mechanical properties as the pneumatic actuator. By mechanical properties is meant both physical properties, such as size and mechanical interface, as well as the operational properties, such as stroke length, force, speed etc. The expression "similar mechanical properties" is to be understood such that the function of the existing system should be the same after a replacement. Thus, some properties may differ while some properties must be the same. This may differ between different systems.

Another advantage of the invention is that it will be possible to replace a complete system comprising pneumatic linear actuators. Pneumatic actuators and systems require pressurized air, which is a relatively expensive power source, and which may also be somewhat pollutive since the compressed air normally contains oil in order to lubricate the components in the pneumatic system. By replacing a pneumatic system with electrically power linear actuators, a more energy efficient and clean system can be obtained.

By providing an electric linear actuator with the same or similar mechanical properties, the machinery in which the linear actuator is positioned must not be modified, which will also save some time and cost. Normally, a modification in the mechanical system is much easier to realise than a modification in the electrical control system.

In one example, the linear actuator that is to be replaced cooperates with other pneumatic linear actuators. In such a case, it may be important that the stroke length is the same, but the speed and the force requirements may be allowed to differ.

FIG. 3 shows a split view of a first embodiment of the linear actuator 101, referred to as a lead screw actuator. The actuator comprises a housing 102 and a hollow piston rod 109. The hollow piston rod 109 is suspended in the housing, preferably by a front linear sliding bearing 104. Inside the piston rod, a rotatable, extended and threaded lead screw 105 is suspended, preferably by a rear roller bearing 103 and a front sliding bearing 107. On the screw 105, a nut 106 having an internal thread runs. The nut is attached to the piston rod in a non-rotatable way. The nut will run on the screw when the screw is rotated by the motor 116, and since the piston rod is prevented from rotation by the attachment of the front attachment means to machinery or the like, the nut will not rotate but instead traverse on the screw.

The motor may in this embodiment be any suitable motor, such as a DC-motor, an AC-motor or a stepper motor. In a first example, the motor is a DC-motor that is adapted to be driven with the system voltage of the control system. In this case, there is no need for any specific motor control electronics. If the motor is an AC-motor or a stepper motor, the actuator comprises motor control electronics. The motor is positioned at the end of the screw, integrated in the housing.

The linear actuator is provided with a rotation sensor 108, detecting the rotation of the motor. The sensor detects the rotation of the motor and outputs a signal representing a rotational value. The sensor may either output an analogue value, e.g. a voltage proportional to the rotational position over a turn of the motor, or a digital value, either a pulsed signal where the number of pulses is proportional to the rotational position over a turn of the motor or a signal representing an absolute value for the rotational position of the motor. When a sensor is used that outputs the angular position over one turn, the microcontroller unit can count the number of turns in order to calculate the position of the piston rod. With the rotation sensor measuring the rotation of the motor, a motor speed feedback system can be implemented in the microcontroller. By this, the speed of the motor can be kept constant and an acceleration value may be set.

It is also possible to position the rotation sensor directly on the screw so that the sensor detects the rotation of the screw. The advantage of measuring the rotation directly on the screw is that the same microcontroller system can be used with different types of motors, e.g. having different transmission values, without the need to configure the microcontroller. The sensor is preferably a contactless rotational sensor, e.g. an optical or magnetic sensor, but also other types of sensors are possible to use, depending on e.g. required resolution, life time expectancy or cost.

The linear actuator comprises a microcontroller unit 110 that is adapted to simulate the end position sensors in a regular linear actuator. The microcontroller receives the rotational information from the rotation sensor. The rotational information is then compared with stored reference values representing a first and a second end stop. Since the end stop values will be relative and will be represented by a number of rotated turns and part of a turn, there is no need to incorporate an absolute position detection means in the actuator. This will reduce the cost and the need to calibrate the actuator.

In one development, the reference values representing the first and the second end stops are fixed and pre-programmed at manufacture of the actuator. When the actuator is produced, the end positions are set in a calibration stage of the production. In this way, a number of standard actuators may be supplied, having the same end stop positions as stock pneumatic actuators and where no user programming of the actuator is required.

In another development, the reference values representing the first and the second end stops are programmed by the user. In this case, the actuator comprises a manual user control in a control panel 111, e.g. in the form of buttons. The manual user controls comprises the possibility to extend and retract the actuator manually by two buttons, one for extend and one for retract. Further, two programming buttons are provided, one that sets the first end stop value and one that sets the second end stop value. In order to set an end stop value, the user drives the piston rod of the actuator to a desired position using the manual control buttons. When the desired end stop position is reached, the appropriate programming button is pressed which will store that position as an end stop. The other end stop position is programmed in the same way. After the end stops are set, the actuator will act as a regular linear actuator with either built in or external proximity sensors. The advantage of having programmable end stops is that the adaptation to different use is facilitated. If a production cell or the like is rebuilt, the actuator is easily adapted to the modification.

It is also possible to provide for user information in the manual user controls panel. This may be e.g. indication lamps indicating that the unit is in a programming mode or may indicate other states of the microcontroller, e.g. proper function, supply voltage, etc. If the actuator is provided with an absolute position sensing means, it is also possible to display the position of the piston rod.

FIG. 4 shows a second embodiment of a linear actuator device according to the invention. The linear actuator 201 comprises a housing 202. Inside the housing, a screw 205 having an external thread 206 runs in an extended nut 207 having an internal thread. A piston rod 209 is at its inner end fixedly attached to the screw. The piston rod 209 is provided with a front attachment means 220. The extended nut 207 is preferably made from an internally threaded tube 212 comprising a plurality of segments with an outer support sleeve 213. The extended nut is mounted to the housing in a rotatable way by means of a front bearing device 204 and a rear bearing device 203, preferably roller bearings. In this way, the extended nut can rotate freely inside the housing.

When the linear actuator is to be used, it will be mounted to a rigid member. The part to be actuated is mounted to the front attachment means 220 on the piston rod in a non-rotatable way. This means that the piston rod will not be able to rotate around the centre axis of the linear actuator. Since the piston rod will not rotate, the screw 205 will be driven along the extended nut when the extended nut rotates. In this way, the piston rod will extend out of or retract into the housing, depending on the rotational direction of the extended nut.

The screw 205 is in this example a friction screw with an external thread. The screw may also be of an external ball or roller screw type.

The extended nut is driven by an electric motor 216. The motor may be attached to the rear end of the extended nut in a non-rotatable way. The operating speed of the piston rod, and thus of the linear actuator, will depend of the rotational speed of the motor and the pitch of the thread. The motor may in this embodiment be any suitable motor, such as a DC-motor, an AC-motor or a stepper motor. A rotation sensor 208 is attached to the motor in the same way as described above, or may be attached directly to the extended nut.

The linear actuator comprises a connector 214 for the electrical interface. The linear actuator further comprises a microcontroller 210. The electrical interface, the microcontroller, the programming of end positions and the user control are the same as described above.

In a third embodiment, shown in FIG. 5, the motor 216 is mounted on the outside of and around the extended nut 207. In the shown embodiment, a motor of the outer runner motor type is used. In an outer runner motor, the magnets 231 are positioned at the outer, rotating part 230, i.e. the rotor, of the motor housing. The inner part 232 of the motor is fixedly mounted to the housing 202 of the linear actuator. The stator 233 of the motor is mounted on the inner part 232 of the motor. The stator will thus be positioned between the extended nut and the rotor of the motor. With the stator fixed in the linear actuator housing, the electrical power transfer to the stator coils is simplified. By using this type of motor, a compact linear actuator is achieved, in which the length of the linear actuator device is in the same order of magnitude as the maximum piston stroke, i.e. the length of the motor will not reduce the piston stroke length of the actuator.

The linear actuator comprises a connector 214 for the electrical interface. The linear actuator further comprises a microcontroller 210. The electrical interface, the microcontroller, the programming of end positions and the user control are the same as described above.

In another development, shown in FIG. 6, the motor 216 is also mounted on the outside of and around the extended nut 207. In the shown development, a motor of the inner runner motor type is used. In an inner runner motor, the stator 240 with the windings is mounted fixedly to the housing of the linear actuator. The rotor 241 with the magnets is fixedly mounted to the extended nut 207. The rotor will thus be positioned between the extended nut and the stator of the motor. With the stator fixed to the linear actuator housing, the electrical power transfer to the stator coils is simplified and the heat transfer is improved. By using this type of motor, a compact linear actuator is achieved, in which the length of the linear actuator device is in the same order of magnitude as the maximum piston stroke, i.e. the length of the motor will not reduce the piston stroke length of the actuator.

The linear actuator comprises a connector 214 for the electrical interface. The linear actuator further comprises a microcontroller 210. The electrical interface, the microcontroller, the programming of end positions and the user control are the same as described above.

The invention is not to be regarded as being limited to the embodiments described above, a number of additional variants and modifications being possible within the scope of the subsequent patent claims.

Reference Signs
- 1: Linear actuator device
- 2: Housing
- 3: Second position sensor
- 4: First position sensor
- 5: Extended end position
- 6: Retracted end position
- 7: First air inlet
- 8: Second air inlet
- 9: Piston rod
- 10: Control unit
- 11: Valve unit
- 101: Linear actuator device
- 102: Housing
- 103: Rear roller bearing
- 104: Front linear sliding bearing
- 105: Threaded screw
- 106: Nut
- 107: Sliding bearing
- 108: Rotation sensor
- 109: Piston rod
- 110: Microcontroller unit
- 111: Control panel
- 114: Connector
- 116: Motor
- 120: Front attachment means
- 121: Extended end position
- 122: Retracted end position
- 201: Linear actuator device
- 202: Housing
- 203: Rear bearing device
- 204: Front bearing device
- 205: Screw
- 206: External thread
- 207: Extended nut
- 208: Rotation sensor
- 209: Piston rod
- 210: Microcontroller unit
- 211: Control panel
- 212: Internally threaded tube
- 213: Outer support sleeve
- 214: Connector
- 216: Motor
- 220: Front attachment means
- 230: Rotating part
- 231: Magnets
- 232: Inner part of the motor
- 233: Stator
- 240: Stator
- 241: Rotor

The invention claimed is:

1. A linear actuator comprising:
   a housing,
   a piston rod,
   an electrical motor,
   a transmission configured to convert rotation of the electrical motor to linear movement of the piston rod, and
   an integrated electrical interface coupled with the motor and having an input adapted to extend the piston rod, an input adapted to retract the piston rod, an output adapted to indicate a retracted end position of the piston rod, and an output adapted to indicate an extended end position of the piston rod, wherein
   the linear actuator includes a motor having a rotor fixedly attached to the internally threaded nut, and a stator fixedly attached to the housing, the stator and the rotor being positioned around the extended internally threaded nut.

2. The linear actuator device according to claim 1, wherein the electrical interface includes a rotation sensor adapted to measure the rotation of one of the motor and the transmission and a microcontroller adapted to receive a signal from the rotation sensor.

3. The linear actuator device according to claim 1, wherein the retracted end position and the extended end position are programmable.

4. The linear actuator device according to claim 1, wherein the electrical interface includes a user interface having manual buttons and indication means.

5. The linear actuator device according to claim 4, wherein an end position is programmed into the electrical interface by manually driving the piston rod to the desired end position and then using the user interface to store the end position as one of a retracted end position and an extended end position.

6. The linear actuator device according to claim 1, wherein the transmission includes a nut fixedly attached to the piston rod and an extended, externally threaded lead screw connected to the motor.

7. The linear actuator device according to claim 1, wherein the transmission includes a screw fixedly attached to the piston rod and an extended, internally threaded nut connected to the motor.

8. The linear actuator device according to claim 7, wherein the internally threaded nut includes a plurality of segments.

9. The linear actuator device according to claim 7, wherein the stator is positioned between the rotor and the extended nut.

10. The linear actuator device according to claim 7, wherein the rotor is positioned between the stator and the extended nut.

* * * * *